(12) United States Patent
Mori et al.

(10) Patent No.: US 11,252,296 B2
(45) Date of Patent: Feb. 15, 2022

(54) FACSIMILE FOR DISPLAYING ADDRESS CONFIRMATION, CONTROL METHOD, AND NON-TRANSITORY RECORDING MEDIUM

(71) Applicants: Takuya Mori, Tokyo (JP); Akira Yokoyama, Kanagawa (JP); Hayato Aikawa, Kanagawa (JP)

(72) Inventors: Takuya Mori, Tokyo (JP); Akira Yokoyama, Kanagawa (JP); Hayato Aikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/192,423

(22) Filed: Mar. 4, 2021

(65) Prior Publication Data

US 2021/0289098 A1    Sep. 16, 2021

(30) Foreign Application Priority Data

Mar. 16, 2020 (JP) .............................. JP2020-045340
Feb. 17, 2021 (JP) .............................. JP2021-023286

(51) Int. Cl.
*H04N 1/32* (2006.01)
*H04N 1/327* (2006.01)
*H04N 1/00* (2006.01)

(52) U.S. Cl.
CPC ..... *H04N 1/32096* (2013.01); *H04N 1/00408* (2013.01); *H04N 1/00424* (2013.01); *H04N 1/32128* (2013.01); *H04N 1/32765* (2013.01); *H04N 2201/3202* (2013.01); *H04N 2201/3204* (2013.01)

(58) Field of Classification Search
CPC ........... H04N 1/32096; H04N 1/00408; H04N 1/00424; H04N 1/32128; H04N 1/32765; H04N 2201/3202; H04N 2201/3204
See application file for complete search history.

(56) References Cited

U.S. PATENT DOCUMENTS

| 2005/0195446 | A1  | 9/2005 | Kasatani |
| 2009/0063959 | A1  | 3/2009 | Stejic |
| 2011/0051179 | A1* | 3/2011 | Iga ..................... H04N 1/32096 358/1.15 |
| 2012/0147436 | A1* | 6/2012 | Nishiyama ......... H04N 1/32096 358/406 |

(Continued)

FOREIGN PATENT DOCUMENTS

| JP | 2005-244411 | 9/2005 |
| JP | 2007-258920 | 10/2007 |

(Continued)

*Primary Examiner* — Nicholas Pachol
(74) *Attorney, Agent, or Firm* — Harness, Dickey & Pierce, P.L.C.

(57) ABSTRACT

A facsimile, a control method, and a non-transitory recording medium. The facsimile designates destination information according to a designation operation by a user, extracts the destination information from an image indicated by image information, determines whether the destination information designated according to the designation operation and the destination information extracted from the image match, and display on a display, a notification screen based on a result of determination.

20 Claims, 9 Drawing Sheets

(56) References Cited

U.S. PATENT DOCUMENTS

| | | | |
|---|---|---|---|
| 2015/0138598 A1* | 5/2015 | Yamamichi | H04N 1/32667 358/1.15 |
| 2016/0277603 A1 | 9/2016 | Aoki et al. | |
| 2019/0222713 A1* | 7/2019 | Nakabayashi | H04N 1/00209 |

FOREIGN PATENT DOCUMENTS

| | | |
|---|---|---|
| JP | 2008-167095 | 7/2008 |
| JP | 2009-048408 | 3/2009 |
| JP | 2016-005257 | 1/2016 |

* cited by examiner

FIG. 3A

| REGISTRATION ID | NAME | FACSIMILE NUMBER | MAIL ADDRESS | ... |
|---|---|---|---|---|
| 1 | COMPANY A | 11111118 | A@aaa.com | ... |
| 2 | COMPANY B | 11111119 | B@bbb.com | ... |
| ... | | | | |

FIG. 3B

| TRANSMISSION DATE AND TIME | FACSIMILE NUMBER | ... | ... |
|---|---|---|---|
| JULY 15, 2019 9:00:00 | 12345678 | ... | ... |
| JULY 25, 2019 10:00:00 | 12345679 | ... | ... |
| ... | | | |

| KEYWORDS INDICATING DESTINATION | KEYWORDS INDICATING FACSIMILE NUMBER |
|---|---|
| TO | FAX |
| DESTINATION | FAX NUMBER |
| ATTENTION | FACSIMILE |
| TRANSMISSION DESTINATION | FACSIMILE NUMBER |

FACSIMILE FOR DISPLAYING ADDRESS CONFIRMATION, CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Applications No. 2020-045340, filed on Mar. 16, 2020 and No. 2021-023286, filed on Feb. 17, 2021, in the Japan Patent Office, the entire disclosure of which is hereby incorporated by reference herein.

BACKGROUND

Technical Field

The present disclosure relates to a facsimile, a control method, and a non-transitory recording medium.

Related Art

A facsimile for transmitting image information has been known. For example, destination information (for example, a facsimile number) is designated according to a user's designation operation, and image information is transmitted to a destination identified by the destination information.

SUMMARY

Embodiments of the present disclosure describe a facsimile, a control method, and a non-transitory recording medium. The facsimile designates destination information according to a designation operation by a user, extracts the destination information from an image indicated by image information, determines whether the destination information designated according to the designation operation and the destination information extracted from the image match, and display on a display, a notification screen based on a result of determination.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 3A and 3B are diagrams illustrating an example of an address book and an example of a transmission history according to embodiments of the present disclosure;

Figure 1:
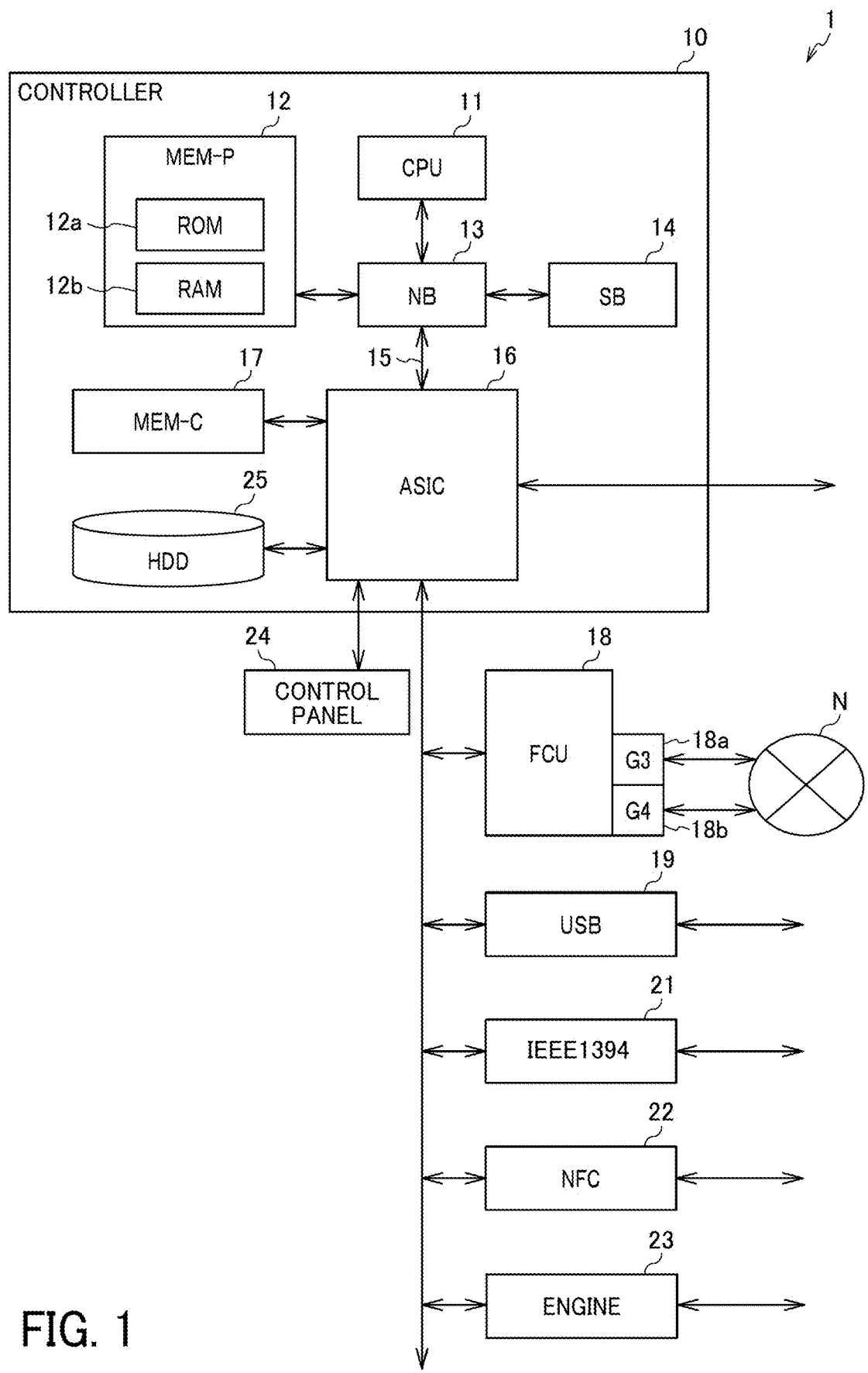
FIG. 1 is a block diagram illustrating a hardware configuration of a multifunctional printer (MFP) as an example of a facsimile according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Several exemplary embodiments of the present disclosure are described hereinafter with reference to drawings. Specifically, an example in which the present disclosure is applied to an MFP including a facsimile function is described. However, the present disclosure may be applied to devices other than the MFP. An MFP 1 includes a scanning function in addition to the facsimile function.

FIG. 1 is a block diagram illustrating a hardware configuration of the MFP 1 according to the present embodiment. As illustrated in FIG. 1, the MFP 1 includes a controller 10 and an engine 23. The controller 10 and the engine 23 are connected by a Peripheral Component Interface (PCI) bus.

The controller 10 controls the entire MFP 1 and controls rendering, communication, and input from the control panel. Examples of the engine 23 include a monochrome plotter, a single-drum color plotter, a four-drum color plotter, a scanner engine, and a facsimile engine. In this example, the engine 23 is a printer engine and the like that can be connected to the PCI bus.

The controller 10 includes a CPU 11, a north bridge (NB) 13, a system memory (MEM-P) 12, a south bridge (SB) 14, a local memory (MEM-C) 17, an Application Specific Integrated Circuit (ASIC) 16, and a hard disk drive (HDD) 25. The NB 13 and the ASIC 16 are connected by an Accelerated Graphics Port (AGP) bus 15. Further, the MEM-P 12 includes a Read Only Memory (ROM) 12a and a Random Access Memory (RAM) 12b.

The CPU 11 controls operation of the entire MFP 1 and includes a chipset including NB 13, MEM-P 12, and SB 14, and is connected to other devices through the chipset. The NB 13 is a bridge for connecting the CPU 11 to the MEM-P 12, SB 14, and AGP bus 15, and includes a memory controller that controls reading and writing to the MEM-P 12, a PCI master, and an AGP target. The MEM-P 12 is a system memory used as a memory for storing programs and data, a memory for expanding programs and data, a memory for drawing for a printer, and the like, and includes a ROM 12*a* and a RAM 12*b*.

The ROM 12*a* is a read-only memory used as a memory for storing programs and data, and the RAM 12*b* is a memory for expanding programs and data, and a writable and readable memory used as a drawing memory for a printer and the like. The SB 14 connects the NB 13 with a PCI device or a peripheral device. The SB 14 is connected to the NB 13 through the PCI bus. The network interface (I/F) and the like are also connected to the PCI bus.

The ASIC 16 is an integrated circuit (IC) dedicated to image processing, and connects the AGP bus 15, the PCI bus, the HDD 25, and the MEM-C 17. The ASIC 16 includes a PCI target, an AGP master, an arbiter (ARB) as a core of the ASIC 16, a memory controller for controlling the MEM-C 17, a plurality of direct memory access controllers (DMACs) for performing rotation and the like of image data by a hardware logic, and a PCI unit for exchanging data with the engine 23 through the PCI bus.

A facsimile control unit (FCU) 18, a Universal Serial Bus (USB) 19, and an Institute of Electrical and Electronics Engineers (IEEE) 1394 interface 21 are connected to the ASIC 16 through the PCI bus. A control panel 24 is directly connected to the ASIC 16. The MEM-C 17 is a local memory used as a buffer for image data to be copied or a code buffer.

The AGP bus 15 is a bus interface for a graphics accelerator card, which has been proposed to accelerate graphics processing. Through directly accessing the MEM-P 12 by high-throughput, speed of the graphics accelerator card is improved.

The FCU 18 is hardware that controls the facsimile function. Specifically, the FCU 18 is connected to a communication line N (for example, a telephone line) and communicates with an external device by using the facsimile function. For example, the FCU 18 receives image information from an external facsimile through the communication line N. The image information is image data indicating an image (for example, an image of a document). Further, the FCU 18 transmits image information to the external device through the communication line N.

As illustrated in FIG. 1, the FCU 18 is provided with a Group 3 (G3) terminal 18*a* and a Group 4 (G4) terminal 18*b*. The FCU 18 transmits and receives image information Da by G3 protocol communication through the G3 terminal 18*a*. Further, the FCU 18 transmits and receives the image information Da by G4 protocol communication through the G4 terminal 18*b*. However, the interface used for transmitting and receiving image information Da is not limited to the above examples. For example, only one of the G3 terminal 18*a* and the G4 terminal 18*b* may be provided.

The HDD 25 of the controller 10 is a storage that stores image data, programs, font data, and forms and stores program files of application software executed by the MFP 1.

Figure 2:
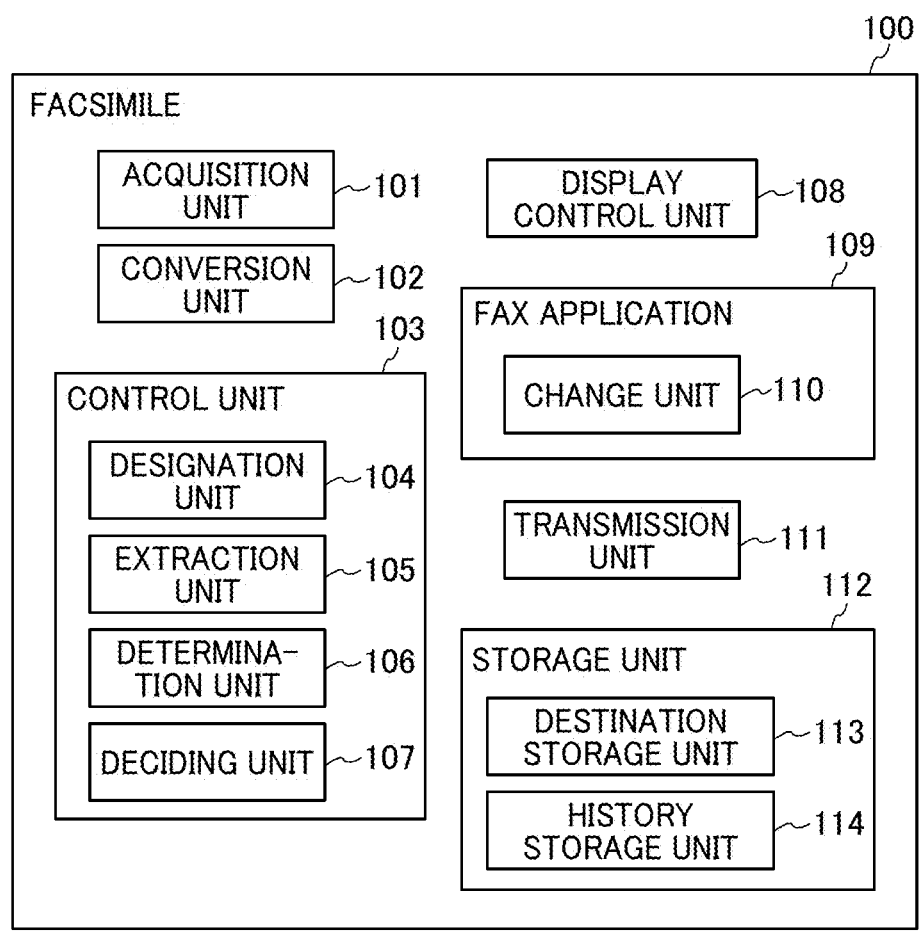
FIG. 2 is a block diagram illustrating a functional configuration of a facsimile according to embodiments of the present disclosure.

FIG. 2 is a functional block diagram of the facsimile 100 (MFP 1) according to the present embodiment. For example, when the CPU 11 described above executes a program, the MFP 1 functions as the facsimile 100. As illustrated in FIG. 2, the facsimile 100 includes an acquisition unit 101, a conversion unit 102, a control unit 103, a display control unit 108, a fax application 109, a transmission unit 111, and a storage unit 112.

The display control unit 108 causes the above-mentioned control panel 24 to display various screens, for example. For example, the display control unit 108 displays screens such as an input screen for destination information for fax transmission and a notification screen (refer to FIGS. 5A to 5C described below). On the input screen, the user designates the destination information for fax transmission from an address book or a transmission history, or directly inputs the destination information. The address book is information including names of a plurality of transmission destinations (company name, etc.) and destination information such as facsimile numbers stored in association with each other in the storage unit 112.

FIG. 3A is an example of an address book in which destinations are stored. As indicated in FIG. 3A, the address book includes a registration ID, a name, a facsimile number, and a mail address. The "registration ID" is identification information for identifying a transmission destination. The "name" is the name of the transmission destination and is displayed on the control panel 24. The "facsimile number" in the address book is used when transmitting image information to a transmission destination through the telephone line. The "mail address" in the address book is used when transmitting image information to a transmission destination through the internet.

Each information in the address book is stored according to an operation of the user, for example, on a registration screen displayed on the control panel 24. In the example illustrated in FIG. 3A, "Company A" is stored as the name of the transmission destination whose registration ID is "1", "11111118" is stored as the facsimile number, and "A@aaa.com" is stored as the mail address.

Further, the transmission history is information in which the history of transmitting image information by the above-mentioned facsimile function. The transmission history is stored in the storage unit 112. Specifically, in the transmission history, destination information of the destination to which the image information has been transmitted in the past and date and time when the image information has been transmitted are stored.

FIG. 3B is an example of the transmission history. As illustrated in FIG. 3B, the transmission history includes transmission date and time and the facsimile number. The "facsimile number" in the transmission history is the facsimile number of the transmission destination to which the image information was transmitted. The "transmission date and time" in the transmission history is the date and time when the image information was transmitted. For example, a transmission to facsimile number 12345678 at 9:00 on Jul. 15, 2019, is stored in the transmission history. The transmission history is automatically stored when a facsimile transmission is executed.

The acquisition unit 101 acquires the image information. Specifically, the image information generated by the above-mentioned scanning function is acquired by the acquisition unit 101. As described below, the image information acquired by the acquisition unit 101 is transmitted to the external device (for example, another facsimile) by the transmission unit 111.

The conversion unit 102 executes an optical character reader (OCR) conversion process on the image information acquired by the acquisition unit 101. The image information is converted into document information by the OCR conversion process executed by the conversion unit 102. Specifically, an image indicated by image information (for example, an image illustrated in FIG. 4B described below) may include characters. In the OCR conversion process, the characters included in the image indicated by the image information are recognized, and character codes indicating the characters are generated. The document information is information including the character codes generated from the characters included in the image indicated by the image information.

The control unit 103 implements the above-mentioned facsimile function, and includes a designation unit 104, an extraction unit 105, a determination unit 106, and a deciding unit 107. The designation unit 104 designates the destination information (for example, a facsimile number) according to a user's designation operation. The destination information is information for designating the destination of the image information and is designated by the designation operation including a plurality of steps. For example, the designation unit 104 designates the destination information input through the fax transmission screen displayed by the display control unit 108. The destination information may be a mail address that is the destination of an internet fax, an internet protocol (IP) address or host name that is the destination of an IP-fax, or a uniform resource locator (URL) or path of the folder when transmitting to a specific folder.

The designation operation includes an operation of selecting one of the destinations stored in the address book described above. For example, by displaying a button corresponding to each destination on the address book screen displayed by the display control unit 108 and pressing any of the buttons, the destination corresponding to the button is selected.

A destination storage unit 113 is included in the storage unit 112 of the facsimile 100. The destination storage unit 113 stores the address book. When any one of the destinations stored in the address book is selected, the destination information of the destination is identified by the designation unit 104.

Further, the designation operation includes an operation of selecting one of the destinations (destination information) stored in the above-mentioned transmission history. Specifically, the storage unit 112 includes a history storage unit 114. The history storage unit 114 described above stores the transmission history. When any of the destination information stored in the transmission history is selected, the destination information is designated by the designation unit 104.

In addition, the designation operation includes an operation of entering destination information (hereinafter, "direct input") using a control panel (numeric keypad) for entering numerical values. The above-mentioned control panel 24 is an example of the control panel for directly inputting the destination information. However, a control panel for entering numerical values may be provided separately from the control panel 24.

The extraction unit 105 extracts the destination information from the image indicated by the image information. Specifically, the image indicated by the image information transmitted to the destination (for example, the image illustrated in FIG. 4B described below) may include the destination information of the destination. However, the image usually contains a character string other than the destination information of the destination. The extraction unit 105 extracts a character (for example, number) string indicating the destination information of the destination from the character strings included in the image indicated by the image information. Specifically, the extraction unit 105 extracts the character string indicating the destination information of the transmission destination from the document information generated by the above-mentioned OCR conversion process. Details of the above process is described with reference to FIGS. 4A and 4B described below.

The determination unit 106 determines whether the destination information designated by the designation unit 104 and the destination information extracted by the extraction unit 105 match. Specifically, the determination unit 106 determines whether the destination information designated by the user's designation operation matches the destination information extracted from the image information. In the above process, if incorrect destination information is designated by the user's designation operation, the determination unit 106 determines that the destination information does not match.

The determination by the determination unit 106 is executed by a determination process (refer to Sa13 in FIG. 6A) described below. Further, the display control unit 108 displays a notification screen (refer to FIGS. 5A to 5C described below) based on a determination result of the determination unit 106. According to the above notification screen, the user is notified that the wrong destination information has been designated.

The deciding unit 107 decides either the destination information designated by the designation unit 104 or the destination information extracted by the extraction unit 105. Specifically, on the above-mentioned notification screen, the user can select either the destination information designated by the designation unit 104 or the destination information extracted by the extraction unit 105. The deciding unit 107 decides the destination information selected by the user. The transmission unit 111 transmits the image information acquired by the acquisition unit 101 to the destination identified from the destination information decided by the deciding unit 107.

The fax application 109 accepts various operations of the user and displays various images on the control panel 24. As illustrated in FIG. 2, the fax application 109 includes a change unit 110. The change unit 110 changes a mode of the notification screen depending on whether the designation operation is performed using the above-mentioned address book, the designation operation is performed using the transmission history, or the destination information is directly input. The fax application 109 may be configured to include the control unit 103.

It is assumed that the mode of the notification screen is uniform regardless of a procedure of the designation operation. If the mode of the notification screen is uniform regardless of the procedure of the designation operation, an optimum notification screen may not be displayed. According to the change unit 110 of the present embodiment, since the result image can be changed according to the procedure of the designation operation, such inconvenience can be prevented.

The storage unit 112 stores various types of information. For example, the storage unit 112 stores the image information acquired by the acquisition unit 101 and the document information generated by the conversion unit 102. Further, the storage unit 112 includes the above-mentioned destination storage unit 113 and history storage unit 114.

Figures 4A, 4B:
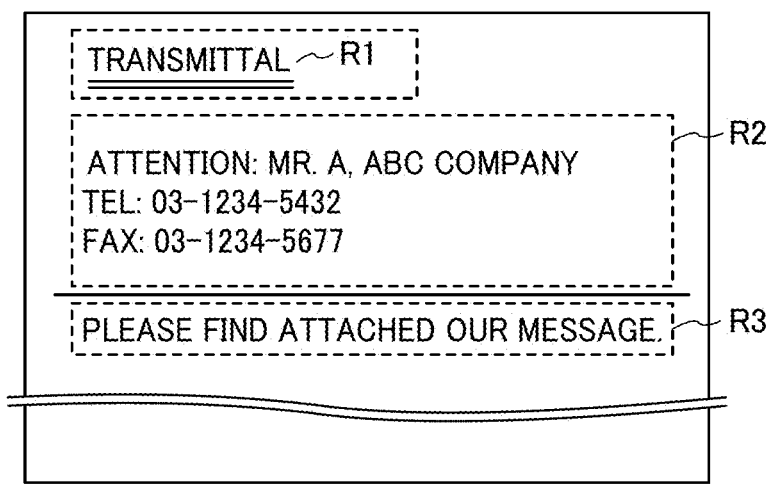
FIGS. 4A and 4B are diagrams illustrating a process for extracting destination information according to embodiments of the present disclosure.

FIGS. 4A and 4B are diagrams illustrating the process for extracting destination information of a destination from the document information. When extracting the destination information of a transmission destination, the facsimile 100 (extraction unit 105) first identifies a predetermined character string (hereinafter referred to as a "keyword") from the character strings of the document information.

FIG. 4A is a diagram illustrating a specific example of the above-mentioned keyword. As illustrated in FIG. 4A, the keywords include a first keyword indicating a destination (transmission destination) and a second keyword indicating a facsimile number (destination information). The above keywords are character strings that are likely to be located immediately before the destination information. However, keywords not indicated in FIG. 4A may be adopted. The facsimile 100 extracts a number string located immediately after the keyword (second keyword) as the destination information of the transmission destination.

FIG. 4B is a specific example of the image indicated by the image information. In the example of FIG. 4B, an image in which character strings are displayed in the area R1 to the area R3 is assumed. Each character string from the above area R1 to the area R3 is converted into the character codes by the above-mentioned OCR conversion process. Further, each character string in the above areas R1 to R3 is recognized as a separate character string (a set of characters).

In the example of FIG. 4B, the first keyword "attention" is included in the character string of the area R2 among the areas R1 to R3. In the example of FIG. 4B, the facsimile 100 extracts the character string "0312345677" located immediately after the second keyword "FAX" from the character string of the area R2 after identifying the area R2. Specifically, only the numbers are extracted from each character included in the character string located immediately after the second keyword. Symbols such as hyphens, parentheses, and colons are not extracted from the characters that make up the character string located immediately after the second keyword.

Figure 5A:
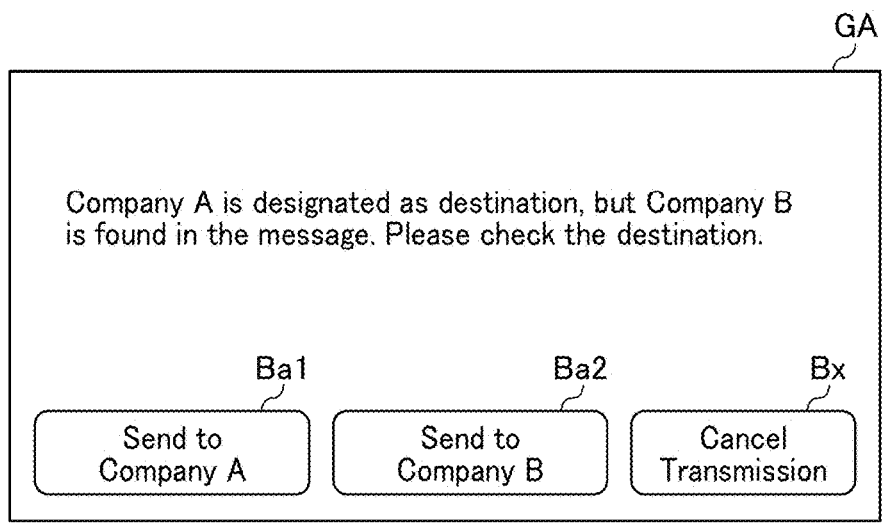
FIGS. 5A, 5B, and 5C are diagrams illustrating examples of notification screens according to embodiments of the present disclosure.
Figure 5B:
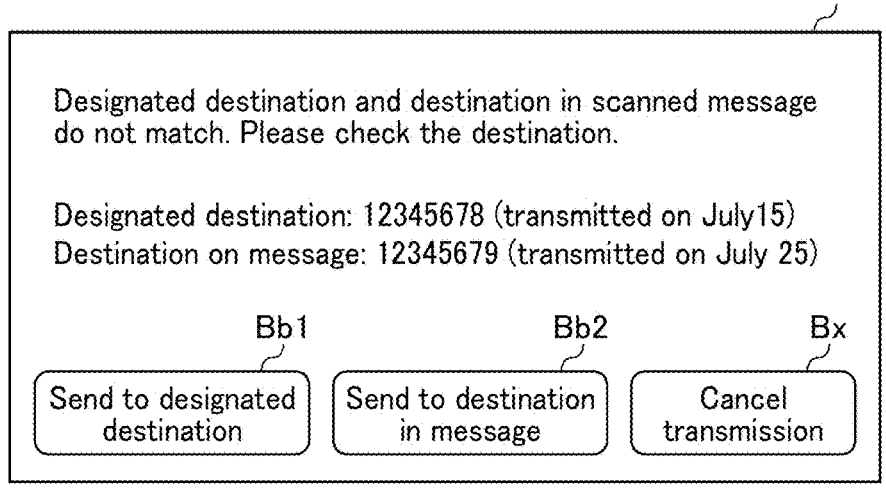
Figure 5C:
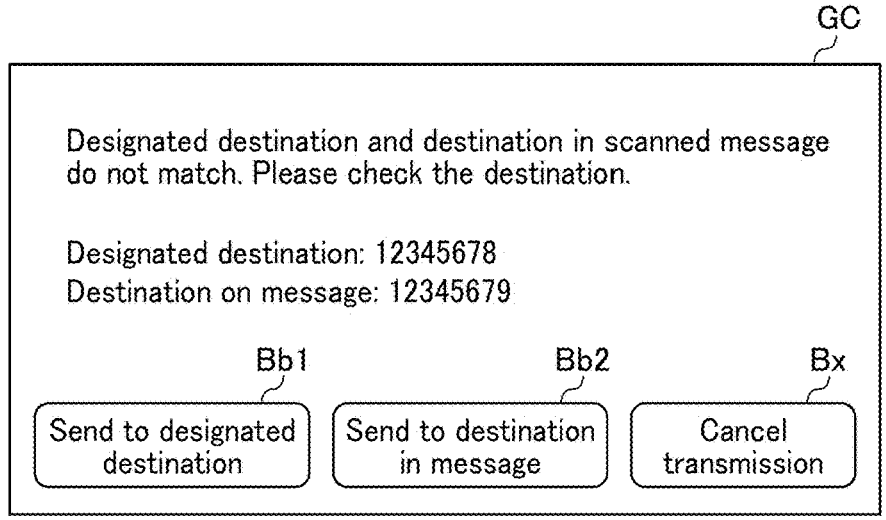

FIGS. 5A to 5C are simulated diagrams of examples of notification screens GA to GC. When the determination unit 106 determines that the designated destination information designated by the designation unit 104 and the extracted destination information extracted by the extraction unit 105 do not match, the change unit 110 automatically displays the notification screens based on the designated destination information, the extraction destination information, and the address book and the transmission history stored in the storage unit 112 according to the designation operation. Details are described below with reference to a flowchart illustrated in FIG. 8.

FIG. 5A is an example of a notification screen GA. In the example of FIG. 5A, it is assumed that "Company A" is selected from the destinations stored in the address book, and the destination information extracted from the image information matches the destination information of "Company B" stored in the address book.

That is, in the example of FIG. 5A, it is assumed that "Company B" should have been selected from the destinations registered in the address book, but the user mistakenly selected "Company A". In the above case, the extraction unit 105 extracts the destination information "11111119" from the image information and the determination unit 106 determines that the designated destination information "11111118" designated by the user's designation operation and the extracted destination information "11111119" extracted from the image information do not match. Then, the change unit 110 searches the address book, determines that both the designated destination information and the extracted destination information are stored in the address book, and displays the notification screen GA.

As illustrated in FIG. 5A, the notification screen GA displays a message that the designated destination information designated by the user's designation operation does not match the extracted destination information extracted from the image information. Specifically, although "Company A" has been selected as the destination by the user, a message indicating that the destination information of "Company B" is described in the image information to be transmitted by the user is displayed on the notification screen GA. The destination information of each of "Company A" and "Company B" may be displayed on the notification screen GA.

As illustrated in FIG. 5A, a button Ba1, a button Ba2, and a button Bx are displayed on the notification screen GA. When the button Ba1 is pressed, the deciding unit 107 decides the designated destination information designated by the user's designation operation as the transmission destination, and the transmission unit 111 transmits the image information to the destination corresponding to the designated destination information. When the button Ba2 is selected, the deciding unit 107 decides the extraction destination information extracted from the image indicated by the image information, and the change unit 110 changes the transmission destination of the image information to the extracted destination information. Then, the transmission unit 111 transmits the image information to the transmission destination corresponding to the extracted destination information. When the button Bx is pressed, the designation operation is canceled, and the transmission of the image information is stopped.

FIG. 5B is an example of the notification screen GB. In the example of FIG. 5B, it is assumed that among the destination information stored in the transmission history information, the destination information of the destination to which the image information was transmitted on "July 15" is selected and the destination information extracted from the image information matches the destination information of the destination to which the image information was transmitted on "July 25" among the destination information stored in the history storage unit 114.

That is, in the example of FIG. 5B, it is assumed that the destination information of the destination to which the image information was transmitted on "July 25" should be selected from the destination information stored in the transmission history, but the user mistakenly selected the destination information of the destination to which the image information was transmitted on "July 15". In the above case, the extraction unit 105 extracts the destination information "12345679" from the image information and the determination unit 106 determines that the designated destination information "12345678" designated by the user's designation operation and the extracted destination information "12345679" extracted from the image information do not match. Then, the change unit 110 searches the transmission history, determines that both the designated destination information and the extracted destination information are stored in the transmission history, and displays the notification screen GB.

As illustrated in FIG. 5B, a message is displayed on the notification screen GB indicating that the designated destination information designated by the user by the designation operation does not match the extracted destination information extracted from the image information. Specifically, the destination information of the destination to which the image information was transmitted was designated on "July 15" by the user's designation operation and a message indicating that the destination information of the destination to which the image information was transmitted on "July 25" is included in the image information transmitted this time is displayed on the notification screen GB. In addition, the destination information of the destination to which the image information was transmitted on "July 15" and the destination information of the destination to which the image information was transmitted on "July 25" are displayed on the notification screen GB.

As illustrated in FIG. 5B, the button Bb1, the button Bb2, and the button Bx described above are displayed on the notification screen GB. When the button Bb1 is pressed, the deciding unit 107 decides the designated destination information designated by the user's designation operation as the transmission destination, and the transmission unit 111 transmits the image information to the destination corresponding to the designated destination information. Further, when the button Bb2 is pressed, the deciding unit 107 decides the extracted destination information extracted from the image indicated by the image information as the transmission destination, the change unit 110 changes the transmission destination of the image information to the extracted destination information, and the transmission unit 111 transmits the image information to the destination corresponding to the extracted destination information. When the button Bx is pressed, the designation operation is canceled and the transmission of the image information is stopped.

FIG. 5C is an example of the notification screen GC. As illustrated in FIG. 5C, a message indicating that the designated destination information designated by the designation operation of directly inputting the user's facsimile number and the extracted destination information extracted from the image information do not match is displayed. Further, on the notification screen GC, the button Bb1, the button Bb2, and the button Bx are displayed in the same manner as the above-mentioned notification screen GB.

Figure 6A:
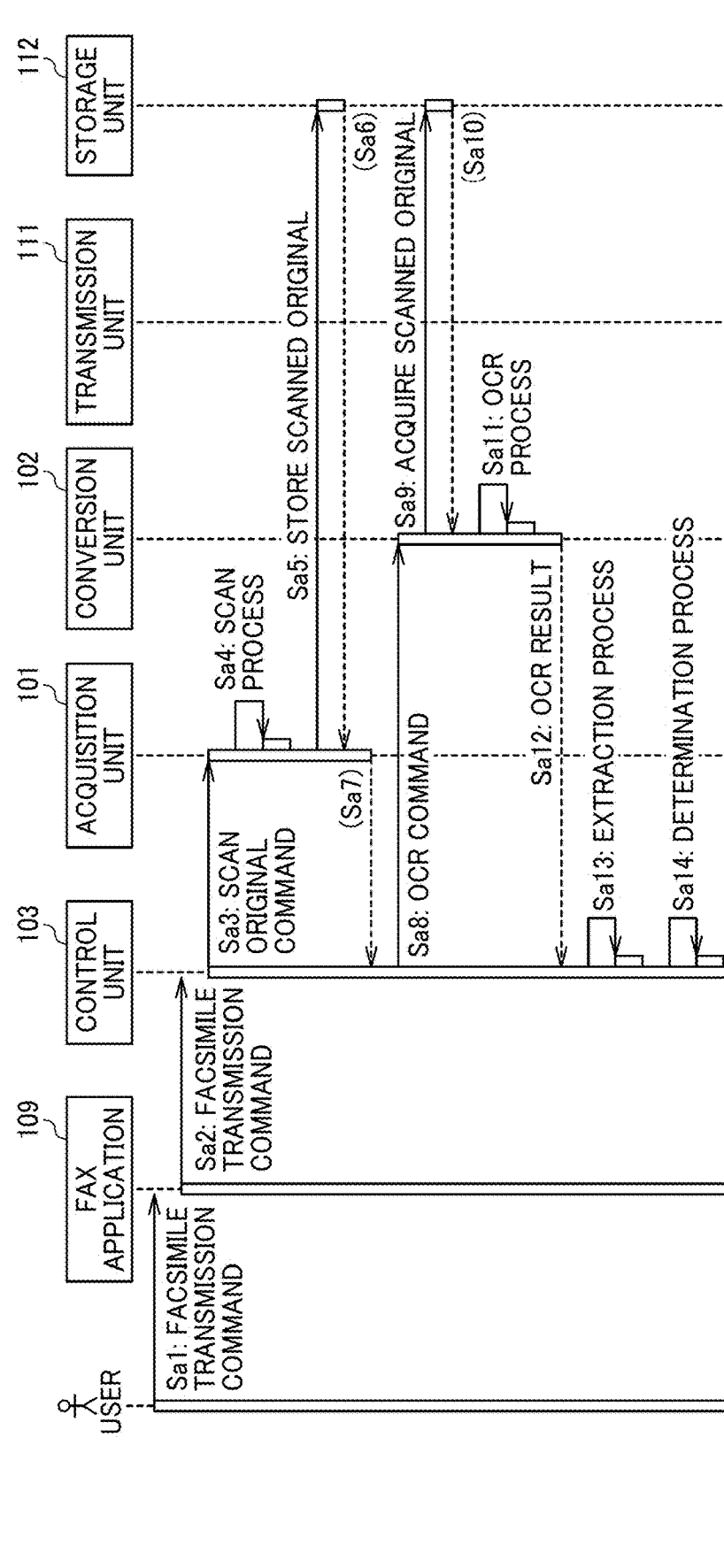
FIGS. 6A and 6B are sequence diagrams illustrating an example of an operation of the facsimile according to embodiments of the present disclosure.
Figure 6B:
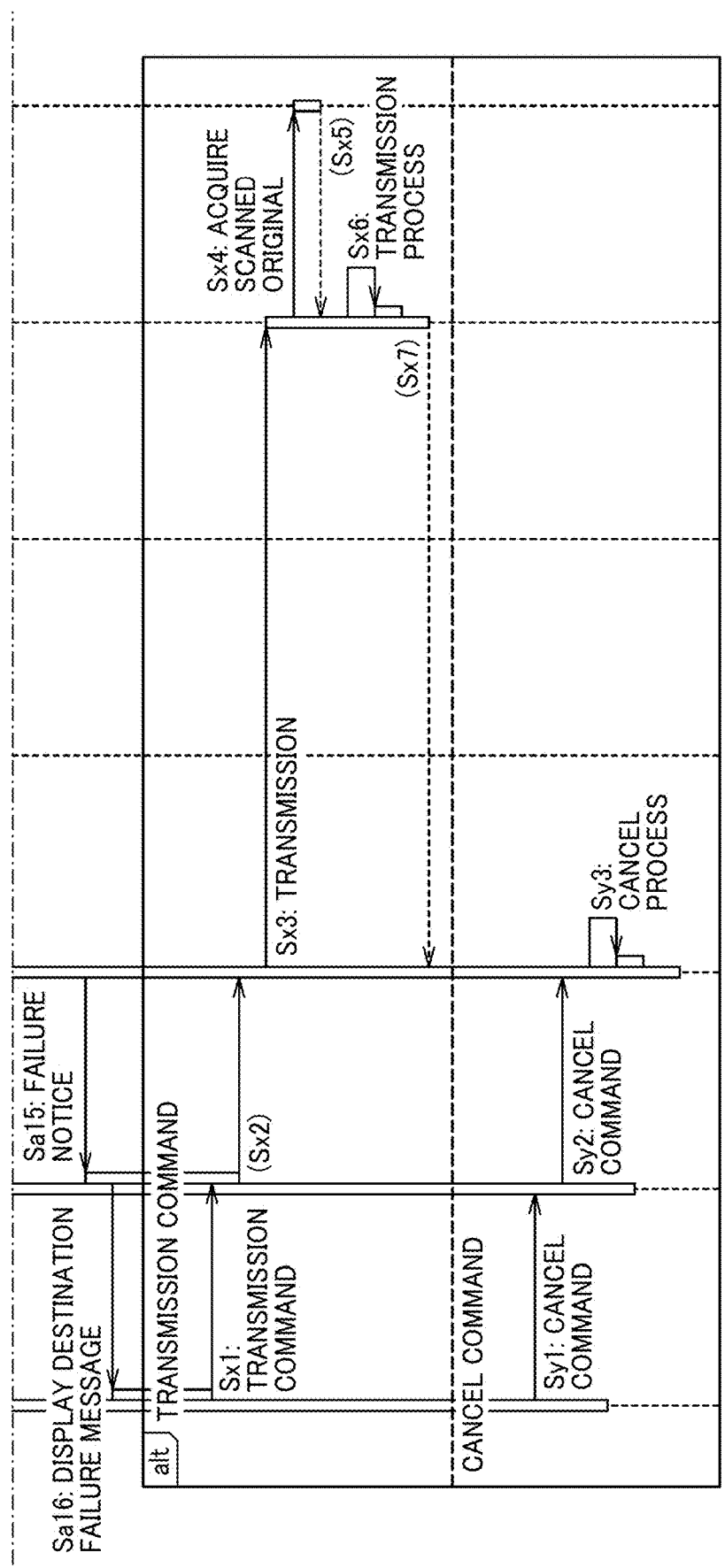

FIGS. 6A and 6B are a sequence diagram illustrating a specific example of a process executed by the facsimile 100 according to the present embodiment. In step Sa1, the fax application 109 receives a command to execute fax transmission from a user as illustrated in FIG. 6A. Specifically, after setting an original in a predetermined position, the user selects (or directly inputs) the destination information of the destination by the above-mentioned designation operation, presses the start key or the like, and instructs the execution of fax transmission. In step Sa2, the fax application 109 transmits a fax transmission execution command to the control unit 103. Upon receiving the above command, the control unit 103 transmits a command for executing original scan to the acquisition unit 101 in step Sa3.

In step Sa4, in response to receiving the original scan command, the acquisition unit 101 executes a scan process to generate (acquire) image information from the original set by the user. In step Sa5, the acquisition unit 101 stores the image information generated from the original in the storage unit 112. In step Sa6, the storage unit 112 notifies the acquisition unit 101 that the image information is stored in the storage unit 112. In step Sa7, the acquisition unit 101 notifies the control unit 103 that the image information has been stored.

In step Sa8, in response to receiving the notification that the image information has been stored, the control unit 103 transmits a command to execute an OCR conversion process to the conversion unit 102. In step Sa9, in response to receiving the above command, the conversion unit 102 requests the storage unit 112 for image information. In step Sa10, in response to the above request, the storage unit 112 transmits the image information stored in step Sa5 to the conversion unit 102.

In step Sa11, in response to receiving the image information, the conversion unit 102 executes the OCR conversion process on the image information. In step Sa12, after executing the OCR conversion process, the conversion unit 102 transmits the document information (OCR result) generated by the OCR conversion process to the control unit 103.

In step Sa13, in response to receiving the document information, the control unit 103 executes an extraction process. Specifically, the above-mentioned keyword (refer to FIG. 4A) is used to extract a character string indicating destination information of the destination from the character strings included in the document information. In step Sa14, the control unit 103 executes a determination process. In the determination process, whether the destination information (destination information designated by the user's designation operation) selected in step Sa1 described above matches the destination information extracted in the extraction process, whether to display the notification screen, and whether to display the notification screen of any of GA to GC when displaying the notification screen is determined. Details are described below with reference to a flowchart illustrated in FIG. 8.

The process to be executed thereafter changes according to the result of the determination in the above determination process. Specifically, when it is determined in the determination process that the destination information designated by the user's designation operation and the destination information extracted by the extraction process match, the image information is transmitted to the destination identified by the destination information (matching the destination information extracted by the extraction process) designated by the designation operation. On the other hand, if it is determined that the destination information does not match, a process after step Sa16 described below is executed. In the specific example of FIGS. 6A and 6B, it is assumed that the determination process determines that the destination information does not match.

In step Sa15, in response to determining that the destination information designated by the user's designation operation and the destination information extracted by the extraction process do not match, the control unit 103 notifies the fax application 109 to that effect. In step Sa16, in response to the above notification, the fax application 109 displays the above notification screens (GA to GC) to the user.

In step Sx1, it is assumed that the button Ba1 and the button Ba2 (refer to FIG. 5A) or the button Bb1 and the button Bb2 (refer to FIGS. 5B and 5C) on the notification screen are pressed. In step Sx2, the fax application 109 determines either the destination information designated by the user's designation operation or the destination information extracted by the extraction process according to pressing of the button B and notifies the control unit 103 of the determined destination information. In step Sx3, the control unit 103 notifies the transmission unit 111 of the notified destination information and instructs the transmission unit to execute the transmission.

In step Sx4, in response to receiving the transmission execution command, the transmission unit 111 requests the storage unit 112 for the image information. In step Sx5, the storage unit 112 transmits the image information stored in the above-mentioned step Sa5 to the transmission unit 111 in response to the above request. In step Sx6, the transmission unit 111 executes a transmission process in response to receiving the image information. In the above transmission process, the image information is transmitted to the destination designated by the destination information notified in step Sx3. In step Sx7, the transmission unit 111 notifies the control unit 103 that the transmission process has been completed.

In step Sy1, when the button Bx described above is pressed among the buttons B on the notification screen displayed in step Sa16, the fax application 109 notifies the control unit 103 of a cancel command in step Sy2. In response to receiving the cancel command, the control unit 103 executes a cancel process in step Sy3. By the above cancel process, each of the above steps is canceled (the generated information is discarded) without transmitting the image information.

Figure 7:
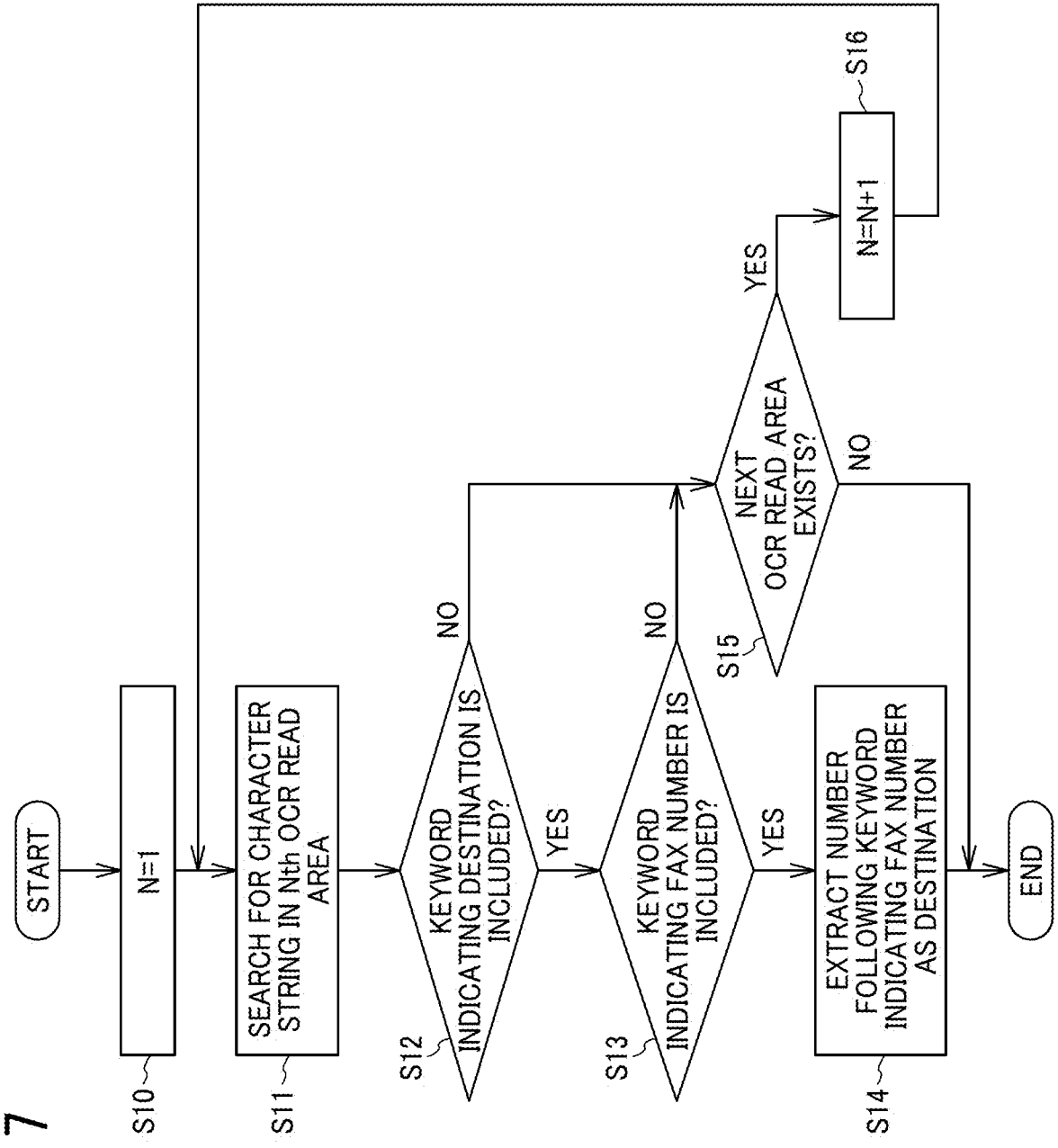
FIG. 7 is a flowchart illustrating an extraction process executed by the facsimile according to embodiments of the present disclosure.

FIG. 7 is a flowchart illustrating the extraction process (step Sa13 in FIG. 6A described above) according to the present embodiment. In step S10, when the extraction process is started, the facsimile 100 sets the initial value "1" in the area number N. Specifically, as described with reference to FIG. 4B described above, the image indicated by the image information may be provided with a plurality of areas R including a character string. The facsimile 100 assigns the area number N to each of the areas R.

In step S11, the facsimile 100 searches for the area R of the area number N after setting the initial value "1" for the area number N. In step S12, the facsimile 100 determines whether the first keyword (for example, the character string "to") indicating the destination is included in the area R. In step S13, when the facsimile 100 determines that the first keyword indicating the destination is included in the area R (Yes in step S12), the facsimile 100 determines whether the second keyword indicating the destination information (facsimile number) is included in the area R.

In step S14, when the facsimile 100 determines that the area R includes the second keyword (Yes in step S13), the facsimile 100 extracts the number string located immediately after the second keyword as the destination information of the transmission destination. After extracting the destination information of the destination, the facsimile 100 ends the extraction process.

In step S16, the facsimile 100 increments the area number N and executes steps S11 to S13 repeatedly until it is determined to be "Yes" in steps S12 and 13 described above. However, when search for all the areas R is completed (No in step S15), the facsimile 100 may end the extraction process without extracting the destination information.

Figure 8:
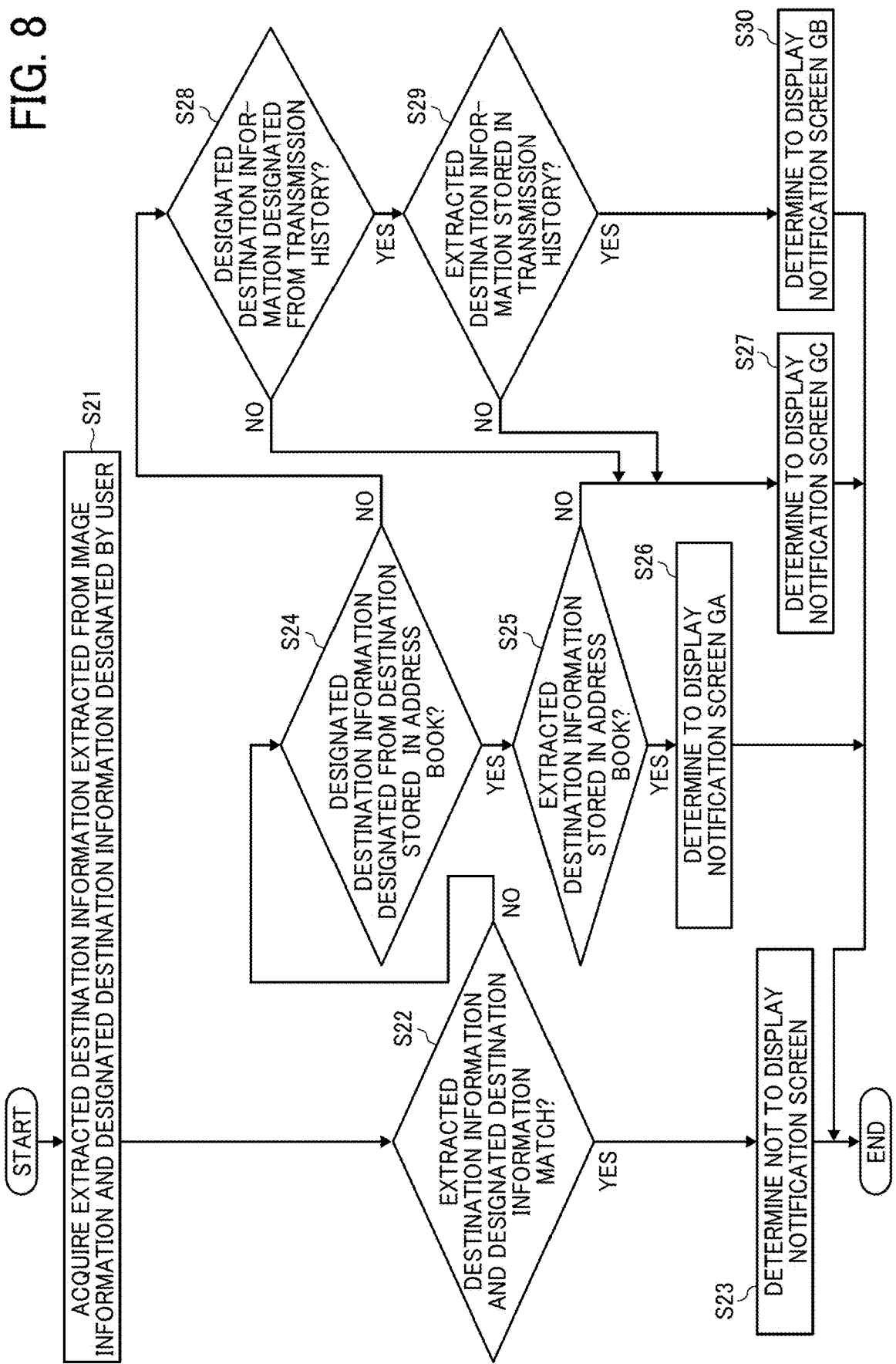
FIG. 8 is a flowchart illustrating a determination process executed by the facsimile according to embodiments of the present disclosure.

FIG. 8 is a flowchart illustrating the determination process (step Sa14 in FIG. 6A described above) according to the present embodiment. In step S21, the determination unit 106 acquires the extracted destination information extracted from the image information and the designated destination information designated by the user. In step S22, the determination unit 106 determines whether the extracted destination information and the designated destination information acquired in step S21 match. In step S23, when the extracted destination information and the designated destination information match (Yes in step S22), the determination unit 106 determines not to display the notification screen. When the determination in step S22 is "Yes", the destination corresponding to the designated destination information and the destination corresponding to the extracted destination information match. The transmission unit 111 refers to either the designated destination information or the extracted destination information and transmits the image information.

In step S24, when the extracted destination information and the designated destination information do not match (No in step S22), the change unit 110 determines whether the designated destination information is designated from the destination stored in the address book. Specifically, when the designated destination information is stored in the address book, the change unit 110 determines that the designated destination information is designated from the destination registered in the address book.

The method for determining whether the designated destination information is designated from the destination registered in the address book may be appropriately changed. For example, when the user designates the destination information from the address book, a modified example is conceivable in which the display control unit 108 stores designation method information indicating this method. The display control unit 108 stores, for example, the designation method information in the RAM 12b.

In the above modified example, when the designation method information indicates that the destination information has been designated from the address book, the change unit 110 determines that the designated destination information acquired in step S21 is designated from the destination stored in the address book. In the above modified example, when the designation method information does not indicate that the destination information has been designated from the address book, the change unit 110 determines that the designated destination information acquired in step S21 is not designated from the destination stored in the address book.

In step S25, when the change unit 110 determines that the designated destination information acquired in step S21 is designated from the destination stored in the address book (Yes in step S24), the change unit 110 determines whether the extracted destination information is stored in the address book. In step S26, when the change unit 110 determines that the extracted destination information is stored in the address book (Yes in step S25), the change unit 110 determines to display the notification screen GA and ends the determination process. On the other hand, when the change unit 110 determines that the extracted destination information is not registered in the address book (No in step S25), the change unit 110 determines to display the notification screen GC in step S27 and ends the determination process.

When the change unit 110 determines that the designated destination information is not designated from the destination stored in the address book (No in step S24), the change unit 110 determines whether or not the designated destination information is designated from the transmission history in step S28. Specifically, when the designated destination information is stored in the transmission history, it is determined that the designated destination information is designated from the destination stored in the transmission history.

The method for determining whether the designated destination information is designated from the transmission history may be appropriately changed. For example, when the user designates the destination information from the transmission history, a modified example is conceivable in which the display control unit 108 stores designation method information indicating this method. The display control unit 108 stores, for example, the designation method information in the RAM 12b.

In the above modified example, when the designation method information indicates that the destination information has been designated from the transmission history, the change unit 110 determines that the designated destination information acquired in step S21 is designated from the destination stored in the transmission history. On the other hand, when the designation method information does not indicate that the destination information has been designated from the transmission history, the change unit 110 determines that the designated destination information acquired in step S21 is not designated from the destination registered in the transmission history.

In step S27, when the change unit 110 determines that the designated destination information is not designated from the transmission history (No in step S28), the change unit 110 determines to display the notification screen GC. On the other hand, when the change unit 110 determines that the designated destination information is designated from the transmission history (Yes in step S28), the change unit 110 determines whether the extracted destination information acquired in step S21 is stored in the transmission history in step S29. When the change unit 110 determines that the extracted destination information is not stored in the transmission history (No in step S29), the change unit 110 determines to display the notification screen GC in step S27. On the other hand, when the change unit 110 determines that the extracted destination information is stored in the transmission history (Yes in step S29), the change unit 110 determines to display the notification screen GB in step S30.

As described above, when the extracted destination information and the designated destination information do not match, the change unit 110 determines to display the notification screen GA if the designated destination information is designated from the destinations stored in the address book and the extracted destination information is stored in the address book. On the other hand, if the designated destination information is designated from the destinations stored in the transmission history and the extracted destination information is stored in the transmission history, the change unit 110 determines to display the notification screen GB and in other cases, displays the notification screen GC.

If the designated destination information is designated from the destination stored in the address book (step S22), or the extracted destination information is stored in the address book (step S24), the change unit 110 may determine to display the notification screen GA. In this case, among the designated destination information and the extracted destination information, for the destination information stored in the address book, the name corresponding to the destination information is displayed and for the destination information that is not stored in the address book, the destination information may be displayed on the notification screen GA.

In addition, if the designated destination information is designated from the destination stored in the transmission history (step S28), or if the extracted destination information is stored in the transmission history (step S29), the change unit 110 may determine to display the notification screen GB. In this case, among the designated destination information and the extracted destination information, for the destination information stored in the transmission history, the name corresponding to the destination information is displayed and for the destination information that is not stored in the transmission history, the destination information may be displayed on the notification screen GB.

Note that the apparatus that executes each of the above processes may be appropriately changed. Each of the above-described functions (a determination unit and the like) may be implemented by one or more processing circuits. Processing circuit includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above embodiments are variously modified. Specific modifications are described below.

In the above-described embodiment, the method of extracting the character string of the destination information of the transmission destination from the document information is not limited to the above example. For example, in the extraction process of the above-described embodiment, the destination information of the transmission destination may not be extracted. In this case, any of the number strings included in the document information may be extracted as the destination information of the transmission destination.

Further, in the above modified example, among the number strings included in the document information, a number string similar to the destination information designated by the designation operation may be preferentially extracted. For example, assume that the document information includes a plurality of numeric strings (hereinafter referred to as "target destination information"). In this case, it is preferable that the target destination information most similar to the destination information designated by the designation operation (hereinafter referred to as "designated destination information") is extracted from the plurality of target destination information.

For example, assume that the designated destination information has M digits. Whether a number of each digit of the designated destination information and a number of each digit of the target destination information match is determined in this case. Similarity "1" (highest similarity) is given to the target destination information in which each digit of M minus 1 digits matches the designated destination information. Similarly, the similarity "2" is given to the target destination information in which M minus 2 digits match the designated destination information, similarity "3" is given to the target destination information in which M minus 3 digits match the designated destination information, and similarity "M" (lowest similarity) is given to the target destination information whose digits do not match the designated destination information. In the above configuration, the target destination information having the highest degree of similarity is extracted from each target destination information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

According to one aspect, the facsimile includes circuitry that designates destination information according to a designation operation by a user, extracts the destination information from an image indicated by image information, determines whether the destination information designated according to the designation operation and the destination information extracted from the image match, and displays on a display, a notification screen based on a result of determination. Accordingly, a user is notified of the result of determination. In this way, the user can be notified, even if there is an error in designation operation.

The invention claimed is:
1. A facsimile comprising:
circuitry configured to
designate first destination information according to a designation operation by a user,
extract second destination information from an image indicated by image information,
determine whether the first destination information and the second destination information match,
in response to a determination that the first destination information and the second destination information do not match, determine a mode of a notification screen based on whether the designation operation is performed by one of at least a first procedure or a second procedure, wherein
the first procedure includes designating, by the user, the first destination information by selecting the first destination information from an address book stored in one or more memories, and
the second procedure includes designating, by the user, the first destination information by selecting the first destination information from a transmission history stored in the one or more memories, and
display the notification screen on a display.

2. The facsimile of claim 1, wherein the circuitry is further configured to:
store in the address book, a name of a transmission destination and destination information of the transmission destination in correspondence with each other; and
in response to a determination that the designation operation is performed by the first procedure, display on the notification screen,
the name of the transmission destination corresponding to the first destination information and the name of the transmission destination corresponding to the second destination information.

3. The facsimile of claim 1, wherein the circuitry is further configured to:
store in the transmission history, history information for identifying a past date when the image information was transmitted and destination information of a transmission destination to which the image information was transmitted in association with each other; and
in response to a determination that the designation operation is performed by the second procedure, display on the notification screen,
a past date when the image information was transmitted to the transmission destination corresponding to the first destination information and a past date when the image information was transmitted to the destination corresponding to the second destination.

4. The facsimile of claim 1, wherein the circuitry is further configured to:
determine the mode of the notification screen based on whether the designation operation is performed by one of at least the first procedure, the second procedure, or a third procedure,
wherein the third procedure includes designating, by the user, the first destination information by manually entering the first destination information.

5. The facsimile of claim 4, wherein, in response to a determination that the designation operation is performed by the third procedure, the circuitry is further configured to:
display on the notification screen the first destination information and the second destination information.

6. The facsimile of claim 1, wherein the circuitry is further configured to:
extract only numbers associated with the second destination information from the image information.

7. The facsimile of claim 1, wherein the circuitry is further configured to:
determine the second destination information from the image information based on a character string located after a keyword.

8. The facsimile of claim 1, wherein the circuitry is further configured to:
display an option to cancel transmission on the notification screen.

9. A control method executed by a computer, the method comprising:
designating first destination information according to a designation operation by a user;
extracting second destination information from an image indicated by image information;
determining whether the first destination information and the second destination information match;
in response to a determination that the first destination information and the second destination information do not match, determining a mode of a notification screen based on whether the designation operation is performed by one of at least a first procedure or a second procedure, wherein
the first procedure includes designating, by the user, the first destination information by selecting the first destination information from an address book stored in one or more memories, and
the second procedure includes designating, by the user, the first destination information by selecting the first destination information from a transmission history stored in the one or more memories; and
displaying the notification screen on a display.

10. The control method of claim 9, wherein the determining the mode of the notification screen includes determining the mode of the notification screen based on whether the designation operation is performed by one of at least the first procedure, the second procedure, or a third procedure,
wherein the third procedure includes designating, by the user, the first destination information by manually entering the first destination information.

11. The control method of claim 10, further comprising:
displaying, on the notification screen, the first destination information and the second destination information in response to a determination that the designation operation is performed by the third procedure.

12. The control method of claim 9, wherein the extracting the second destination information includes extracting only numbers associated with the second destination information from the image information.

13. The control method of claim 9, wherein the extracting the second destination information includes:
determining the second destination information from the image information based on a character string located after a keyword.

14. The control method of claim 9, wherein the displaying the notification screen includes:
displaying an option to cancel transmission.

15. A non-transitory recording medium which, when executed by one or more processors, cause the processors to perform a control method comprising:
designating first destination information according to a designation operation by a user;
extracting second destination information from an image indicated by image information;
determining whether the first destination information and the second destination information match;
in response to a determination that the first destination information and the second destination information do not match, determining a mode of a notification screen based on whether the designation operation is performed by at least one of a first procedure or a second procedure, wherein
the first procedure includes designating, by the user, the first destination information by selecting the first destination information from an address book stored in one or more memories, and the second procedure includes designating, by the user, the first destination information by selecting the first destination information from a transmission history stored in the one or more memories; and displaying the notification screen on a display.

16. The non-transitory recording medium of claim 15, wherein the determining the mode of the notification screen includes determining the mode of the notification screen based on whether the designation operation is performed by one of at least the first procedure, the second procedure, or a third procedure, wherein the third procedure includes designating, by the user, the first destination information by manually entering the first destination information.

17. The non-transitory recording medium of claim 16, wherein the method further comprises:

displaying, on the notification screen, the first destination information and the second destination information in response to a determination that the designation operation is performed by the third procedure.

18. The non-transitory recording medium of claim 15, wherein the extracting the second destination information includes extracting only numbers associated with the second destination information from the image information.

19. The non-transitory recording medium of claim 15, wherein the extracting the second destination information includes:

determining the second destination information from the image information based on a character string located after a keyword.

20. The non-transitory recording medium of claim 15, wherein the displaying the notification screen include:

displaying an option to cancel transmission.

* * * * *